(12) United States Patent
Goldman et al.

(10) Patent No.: US 11,390,030 B2
(45) Date of Patent: Jul. 19, 2022

(54) TECHNIQUES FOR OPTIMIZING PHOTOPOLYMER CURE ENERGY IN ADDITIVE FABRICATION

(71) Applicant: Formlabs, Inc., Somerville, MA (US)

(72) Inventors: Andrew M. Goldman, Stow, MA (US); Henry Whitney, Weymoth, MA (US); Justin Keenan, Lexington, MA (US); Benjamin FrantzDale, Harvard, MA (US); Michael Fogleman, Cary, NC (US); Dmitri Megretski, Carlisle, MA (US)

(73) Assignee: Formlabs, Inc., Somerville, MA (US)

( * ) Notice: Subject to any disclaimer, the term of this patent is extended or adjusted under 35 U.S.C. 154(b) by 177 days.

(21) Appl. No.: 16/817,005

(22) Filed: Mar. 12, 2020

(65) Prior Publication Data

US 2020/0290282 A1  Sep. 17, 2020

Related U.S. Application Data

(60) Provisional application No. 62/819,084, filed on Mar. 15, 2019.

(51) Int. Cl.
*B29C 64/386* (2017.01)
*B33Y 50/00* (2015.01)
(Continued)

(52) U.S. Cl.
CPC .......... *B29C 64/386* (2017.08); *B29C 64/135* (2017.08); *B33Y 50/00* (2014.12); *G05B 19/4099* (2013.01); *G05B 2219/49023* (2013.01)

(58) Field of Classification Search
CPC ... B29C 64/386; B29C 64/135; B29C 64/268; B33Y 50/00; B33Y 10/00; B33Y 40/10; G05B 19/4099; G05B 2219/49023
See application file for complete search history.

(56) References Cited

U.S. PATENT DOCUMENTS 7,783,371 B2    8/2010 John et al.
2008/0169587 A1*  7/2008 Kihara ................. B29C 64/135
                                                   264/408
2019/0353913 A1*  11/2019 Saha ...................... B29C 64/135

FOREIGN PATENT DOCUMENTS

EP      1894704 A1     3/2008
WO   2017/194113 A1    11/2017

OTHER PUBLICATIONS

International Search Report and Written Opinion for International Application No. PCT/US2020/022361, dated Jul. 1, 2020.

* cited by examiner

*Primary Examiner* — Michael M. Robinson
(74) *Attorney, Agent, or Firm* — Wolf, Greenfield & Sacks, P.C.

(57) ABSTRACT

According to some aspects, techniques are provided to more accurately produce fine features in additive fabrication. According to some embodiments, the techniques comprise a process that amplifies exposure to edges and thin positive features whilst not substantially affecting negative features. In particular, an area to be cured may be adapted using signal processing techniques to produce an energy density map. The area may subsequently be cured according to the generated energy density map by, for example, adjusting the scan speed, light power and/or number of passes of the light beam according to the map. As a result, the net exposure to edges and thin positive features may be amplified.

16 Claims, 15 Drawing Sheets

(51) Int. Cl.
*G05B 19/4099* (2006.01)
*B29C 64/135* (2017.01)

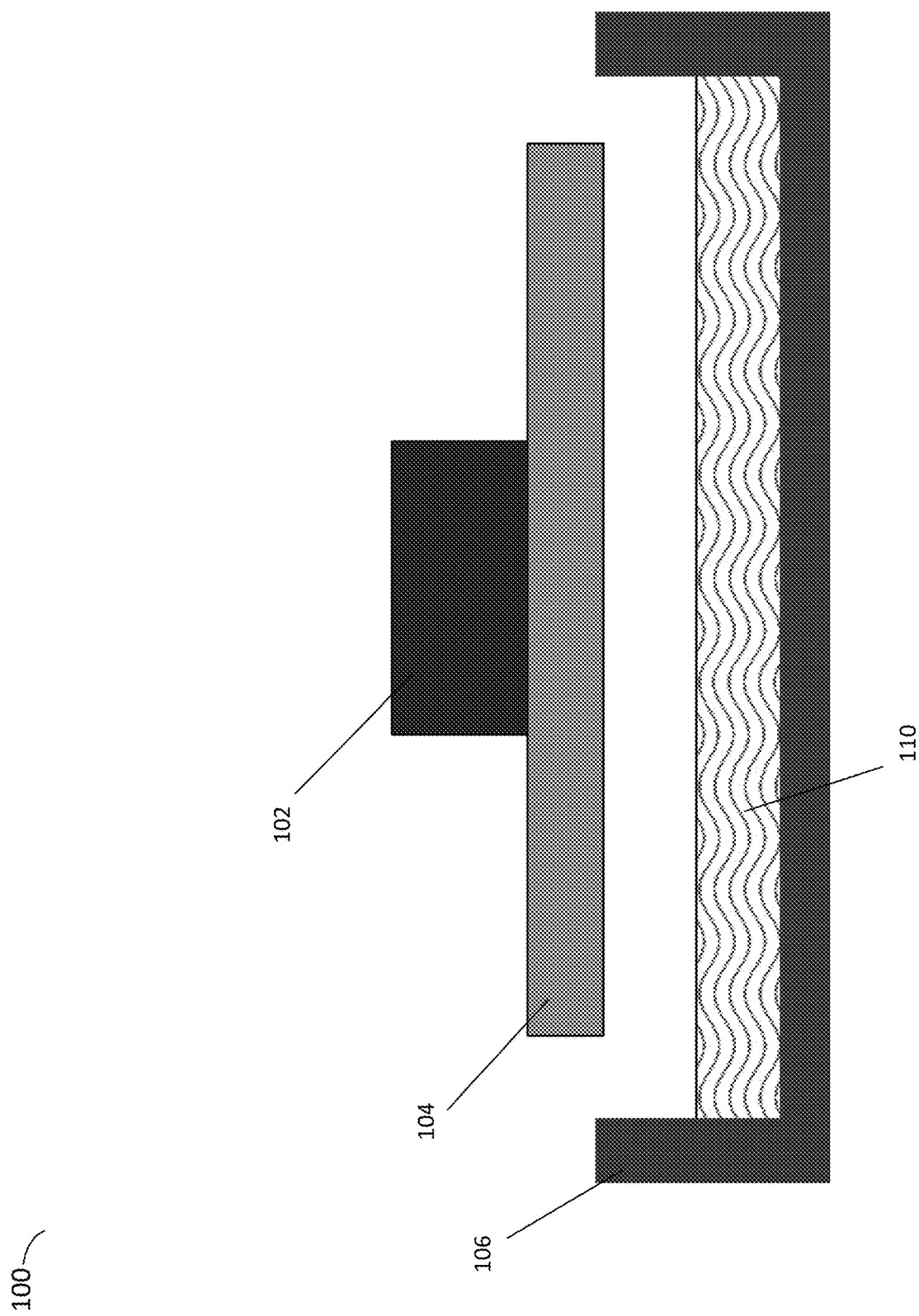

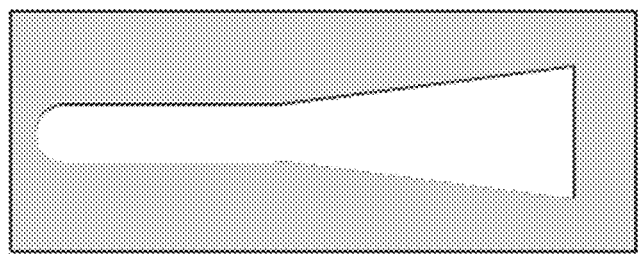
FIG. 7D
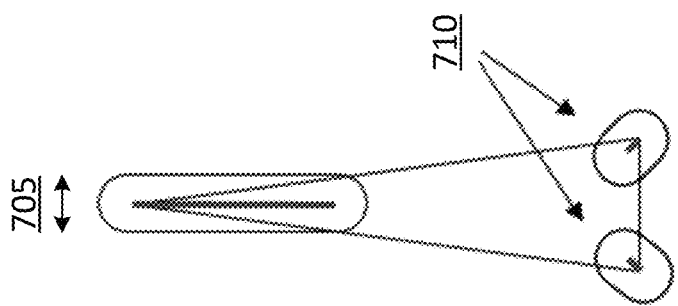
FIG. 7C
FIG. 7B
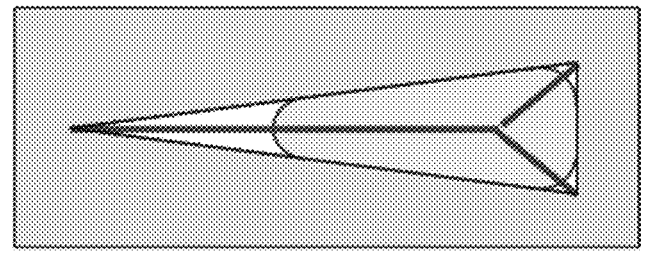
FIG. 7A

TECHNIQUES FOR OPTIMIZING PHOTOPOLYMER CURE ENERGY IN ADDITIVE FABRICATION

CROSS-REFERENCE TO RELATED APPLICATIONS

The present application claims the benefit under 35 U.S.C. § 119(e) of U.S. Provisional Patent Application No. 62/819,084, filed Mar. 15, 2019, titled "Techniques For Optimizing Photopolymer Cure Energy In Additive Fabrication," which is hereby incorporated by reference in its entirety.

BACKGROUND

Additive fabrication, e.g., 3-dimensional (3D) printing, provides techniques for fabricating objects, typically by causing portions of a building material to solidify at specific locations. Additive fabrication techniques may include stereolithography, selective or fused deposition modeling, direct composite manufacturing, laminated object manufacturing, selective phase area deposition, multi-phase jet solidification, ballistic particle manufacturing, particle deposition, laser sintering or combinations thereof. Many additive fabrication techniques build parts by forming successive layers, which are typically cross-sections of the desired object. Typically each layer is formed such that it adheres to either a previously formed layer or a substrate upon which the object is built.

In one approach to additive fabrication, known as stereolithography, solid objects are created by successively forming thin layers of a curable polymer resin, typically first onto a substrate and then one on top of another. Exposure to actinic radiation cures a thin layer of liquid resin, which causes it to harden, change physical properties, and adhere to previously cured layers or the bottom surface of the build platform. In such techniques as stereolithography, the object is formed by moving an area of incident actinic radiation across the layer of liquid resin to complete the cross section of the object being formed. An area of incident actinic radiation could be caused by any light source(s), such as by a laser.

SUMMARY

According to some aspects, a computer-implemented method of generating instructions for an additive fabrication device that, when executed by the additive fabrication device, fabricate a part, is provided, the method comprising accessing a first exposure map for a layer of the part, the first exposure map indicating exposure levels for a plurality of locations in a two-dimensional region, generating, using at least one processor, a second exposure map based on the first exposure map, said generating comprising performing at least one image deconvolution operation on the first exposure map, and generating, using the at least one processor, instructions for an additive fabrication device that, when executed by the additive fabrication device, fabricate at least the layer of the part according to the generated second exposure map.

According to some aspects, at least one computer readable medium is provided comprising instructions that, when executed by at least one processor, perform a method of configuring an additive fabrication device to fabricate a part, the method comprising accessing a first exposure map for a layer of the part, the first exposure map indicating exposure levels for a plurality of locations in a two-dimensional region, generating, using the at least one processor, a second exposure map based on the first exposure map, said generating comprising performing at least one image deconvolution operation on the first exposure map, and generating, using the at least one processor, instructions for the additive fabrication device that, when executed by the additive fabrication device, fabricate at least the layer of the part according to the generated second exposure map.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

FIGS. 1A-1B illustrate a schematic view of a first stereolithographic printer that forms a plurality of layers of a part, according to some embodiments;

FIGS. 7A-7D depict an illustrative approach to forming fine negative features, according to some embodiments;

DETAILED DESCRIPTION

Figure 1B:
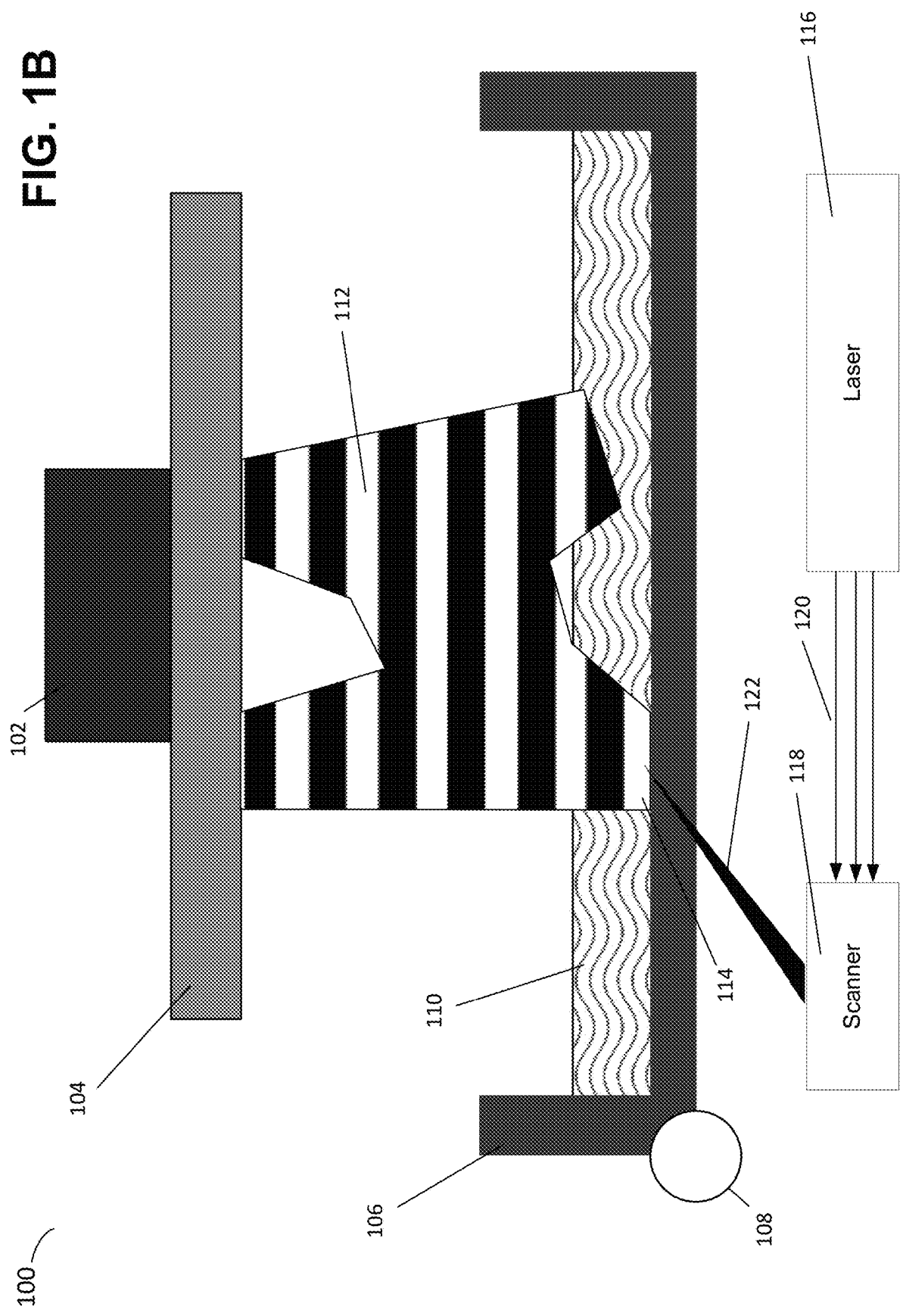

The inventors have recognized and appreciated improved techniques for the application of actinic radiation in stereolithography. As discussed above, in additive fabrication, one or more layers may be formed either on a previously formed layer or on a substrate upon which an object is formed. According to some embodiments, these layers are formed when an area of liquid resin is exposed to an area of actinic radiation. The area of the liquid resin selected for curing within each layer corresponds to a cross-section of the object being fabricated. To cure the area of the liquid selected for curing, a source of actinic radiation, such as a laser beam, traces a path over the area so that sufficient actinic energy is delivered to cure the liquid over the selected area.

In some use cases, a layer may include features sized with a similar order of magnitude to the smallest area that can be cured using the source of actinic radiation. For example, a laser beam may have a spot size (e.g., full width half max of a Gaussian beam) when incident on the liquid photopolymer and consequently it may be difficult to accurately cure areas that are on the order of the spot size. These features, referred to herein as "fine features," can include both positive fine features—where a thin area of solid material is to be formed, and negative features—wherein a solid material is formed in such a way as to leave a thin gap between solid regions.

When conventional stereolithography systems expose an area with a light beam, the edges of the area can often be underexposed. In part this is a result of the light beam having non-zero area, with a varying energy density that approaches zero with greater distance from the center of the beam. Due to this shape and varying energy density, it is possible that some points of the object being fabricated such as edges are exposed by only the edge of the spot with a lower energy density than the center of the spot. Furthermore, fine negative features may be overexposed in conventional stereolithography systems because exposing the solid edges around the negative feature may cause the negative feature itself to get exposed to at least some extent. As a result, negative features below a certain size are often simply not present in a fabricated part because they were filled in with solid material during fabrication.

The inventors have recognized and appreciated techniques to more accurately preserve fine features through a process that amplifies exposure to edges and thin positive features whilst not substantially affecting negative features. In particular, an area to be cured may be adapted using signal processing techniques to produce an energy density map. The area may subsequently be cured according to the generated energy density map by, for example, adjusting the scan speed, light power and/or number of passes of the light beam according to the map. As a result, the net exposure to edges and thin positive features may be amplified.

According to some embodiments, an actinic radiation source may include any suitable source of radiation such as, but not limited to, a laser or an array of Light Emitting Diodes (LEDs). In some embodiments, an array of LEDs may be arranged in an actinic radiation bar having a width equal to the width of a fabrication area. Points along the width of a fabrication area may be selectively illuminated, thereby forming solid material in those locations, and a layer of an object formed by successively moving this bar across the fabrication area.

An illustrative additive fabrication system is depicted in FIGS. 1A-1B. Illustrative stereolithographic printer 100 forms a part in a downward facing direction on a build platform such that layers of the part are formed in contact with a surface of a container in addition to a previously cured layer or the build platform. In the example of FIGS. 1A-1B, stereolithographic printer 100 comprises build platform 104, container 106 and liquid photopolymer 110. A downward facing build platform 104 opposes the floor of container 106, which contains a liquid photopolymer (e.g., a liquid photopolymer resin) 110. FIG. 1A represents a configuration of stereolithographic printer 100 prior to formation of any layers of a part on build platform 104.

As shown in FIG. 1B, a part 112 may be formed layerwise, with the initial layer attached to the build platform 104. In FIG. 1B, the layers of the part 112 are each formed from the same material but are shown in alternating shades merely to visually distinguish them in this example. The container's base surface may be transparent to actinic radiation, such that radiation can be targeted at portions of the thin layer of liquid photocurable photopolymer resting on the base surface of the container. Exposure to actinic radiation cures a thin layer of the liquid photopolymer, which causes it to harden. The layer 114 is at least partially in contact with both a previously formed layer and the surface of the container 106 when it is formed. The top side of the cured photopolymer layer typically bonds to either the bottom surface of the build platform 104 or with the previously cured photopolymer layer in addition to the transparent floor of the container. In order to form additional layers of the part subsequent to the formation of layer 114, any bonding that occurs between the transparent floor of the container and the layer must be broken. For example, one or more portions of the surface (or the entire surface) of layer 114 may adhere to the container such that the adhesion must be removed prior to formation of a subsequent layer.

In order to cure the layer 114 by exposure to actinic radiation, the stereolithographic printer 100 may use the laser 116 and scanner system 118 to produce a laser beam 122. The laser 116 can produce laser light rays 120 which are directed to the scanner system 118. The scanner system 118 directs a laser beam 122 to a location of the build volume. The laser beam 122 may have a spot size comprising a size of the laser beam incident on the location of the build volume. Exposure of a portion of the liquid photopolymer 110 to the laser cures the portion of the liquid photopolymer. For example, when an entire portion of the build volume of layer 114 has been exposed to the laser beam 122, layer 114 of the part 112 may be formed. The scanner system 118 may include any number and type of optical components, such as multiple galvanometers and/or lenses that may be operated to direct the light emitted by laser 116.

Following the curing process, a separation process is typically conducted so as to break any bonds that may have been produced between the cured material of layer 114 and the bottom of container 102. Various techniques may be employed to separate the layers, include rotation and/or sliding the container relative to the build platform. As one example, build platform 104 may be moved away from the container to reposition the build platform for the formation of a new layer and/or to impose separation forces upon any bonds between cured and/or partially cured material and the bottom of the container. In some implementations, the container 106 may be mounted onto a support base such that the container can be moved along a horizontal axis of motion (left or right in FIG. 1B) to introduce additional separation forces.

The illustrative device of FIGS. 1A-1B is provided as one example, and it will be appreciated that the techniques described herein are also applicable to other types of stereolithography devices, including those that utilize a container comprising a thin film, and that scan light across the container in various ways.

Another illustrative stereolithographic device and stages of its operation are depicted in FIGS. 2A-2D, according to some embodiments. As shown in the example of FIGS. 2A-2D, stereolithographic device 200 includes a build platform 205 that is configured to adjust its position towards and away from tank 204 along an axis 206, referred to herein as the Z axis. The build platform 205 may support a part 201 being formed by the stereolithographic process.

In the example of FIGS. 2A-2D, the tank 204 may contain a volume of photopolymer resin 202 and comprise a bottom surface formed by a thin, flexible and/or elastic film 203, substantially transparent to actinic radiation 215. The film 203 may be held under tension by a tensioning device 207. An exposure module 209 may be moved along axis 208, referred to herein as the X axis, such that roller elements 211 are in contact with the lower surface of the film 203. The exposure module 209 comprises an exposure source 210 of actinic radiation 215 which selectively emits actinic radiation along its length (i.e., the axis running orthogonally to both axis 206 and 208, referred to herein as the Y axis). The exposure module 209 further comprises roller elements 211 which are mounted to the top side of the exposure module 209 opposing the bottom of the film 203.

In some embodiments, the film 203 may comprise any highly flexible and/or non-reactive material, such as Teflon® (or other fluoropolymer or polytetrafluoroethylene-based material, such as fluorinated ethylene propylene). The sides of the tank 204 may be comprised of a more rigid material, such as an acrylic plastic, or may alternatively may be formed of a flexible or compliant material.

Figure 2A:
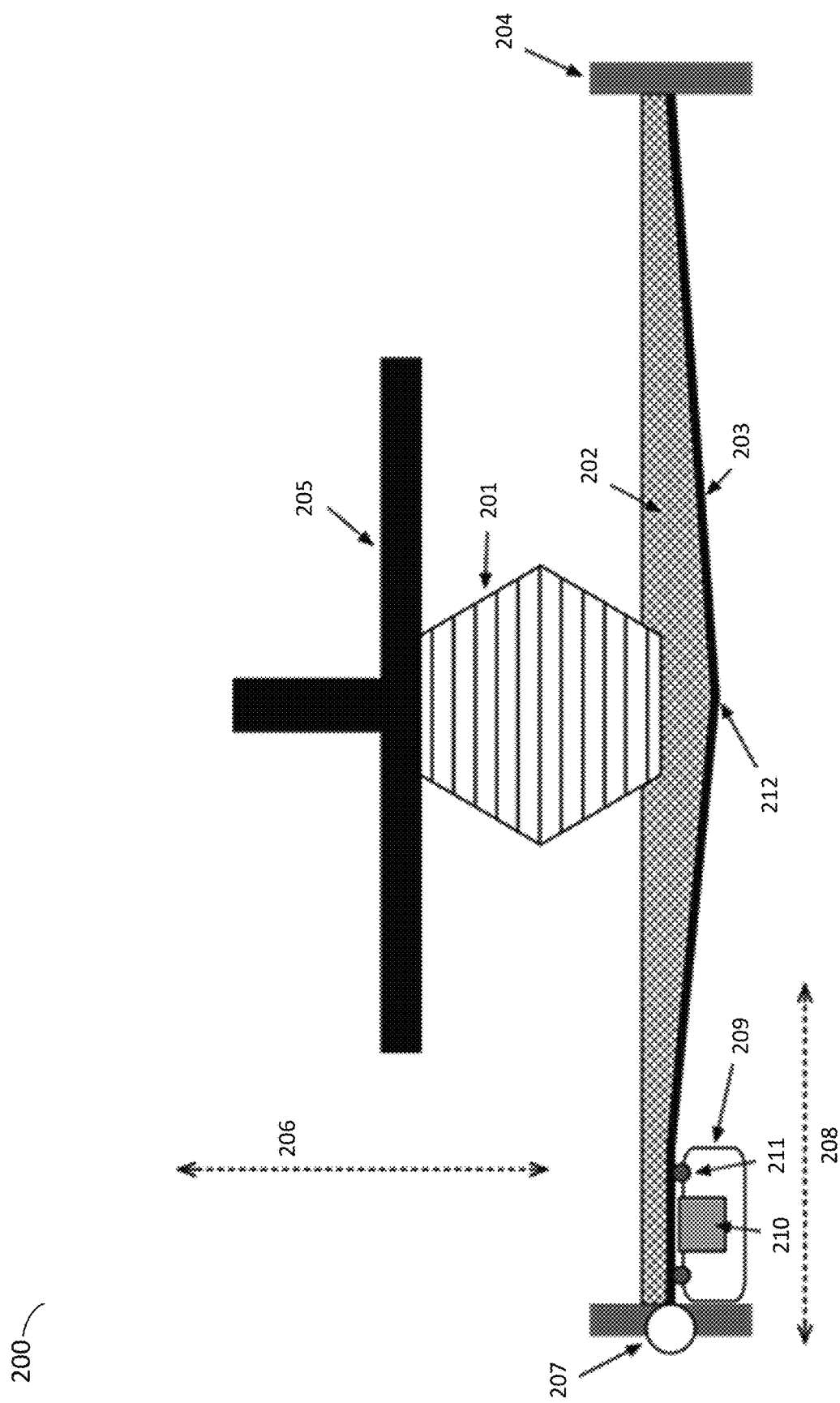
FIGS. 2A-2D illustrate a schematic view of a second stereolithographic printer that forms a plurality of layers of a part, according to some embodiments.

According to some embodiments, the stereolithographic device 200 may be operated to fabricate an object, or part, 201 by selectively solidifying layers of photopolymer resin 202 onto build platform 205 by exposing the photopolymer resin 202 to a source 210 of actinic radiation 215. In particular, as shown in FIG. 2A, the build platform 205 may be moved along axis 206 to place the bottom of the build platform 205 or most recently formed layer of the part 201 in close proximity to the bottom plane of the tank 204 and the film 203. As the bottom film 203 typically has a certain degree of flexibility and/or elasticity, the weight of the photopolymer resin 202 and/or downwards pressure from the motion of the build platform 206 and part 201 may cause the film 203 to form a "sag" 212, or other form of depression.

Figure 2B:
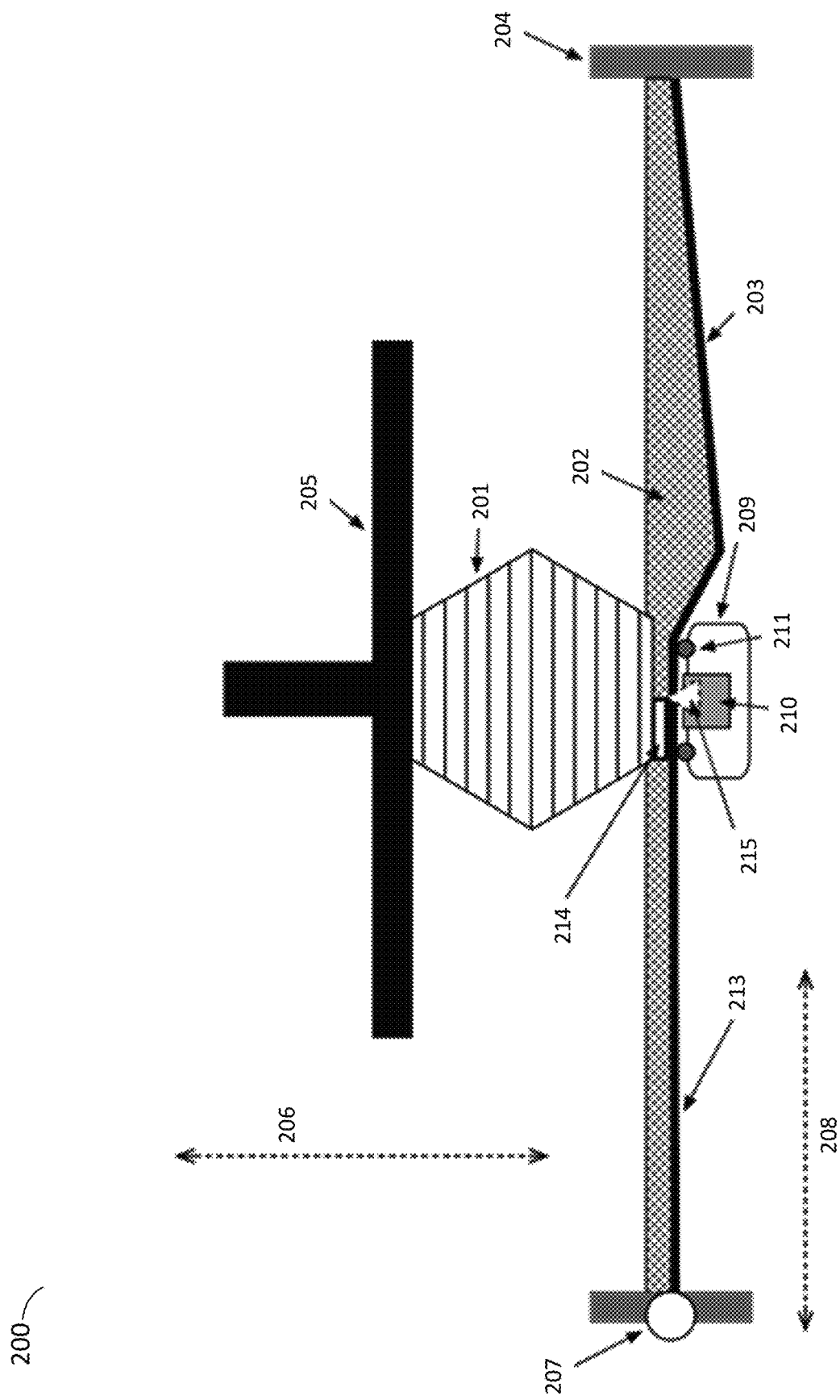
Figure 2C:
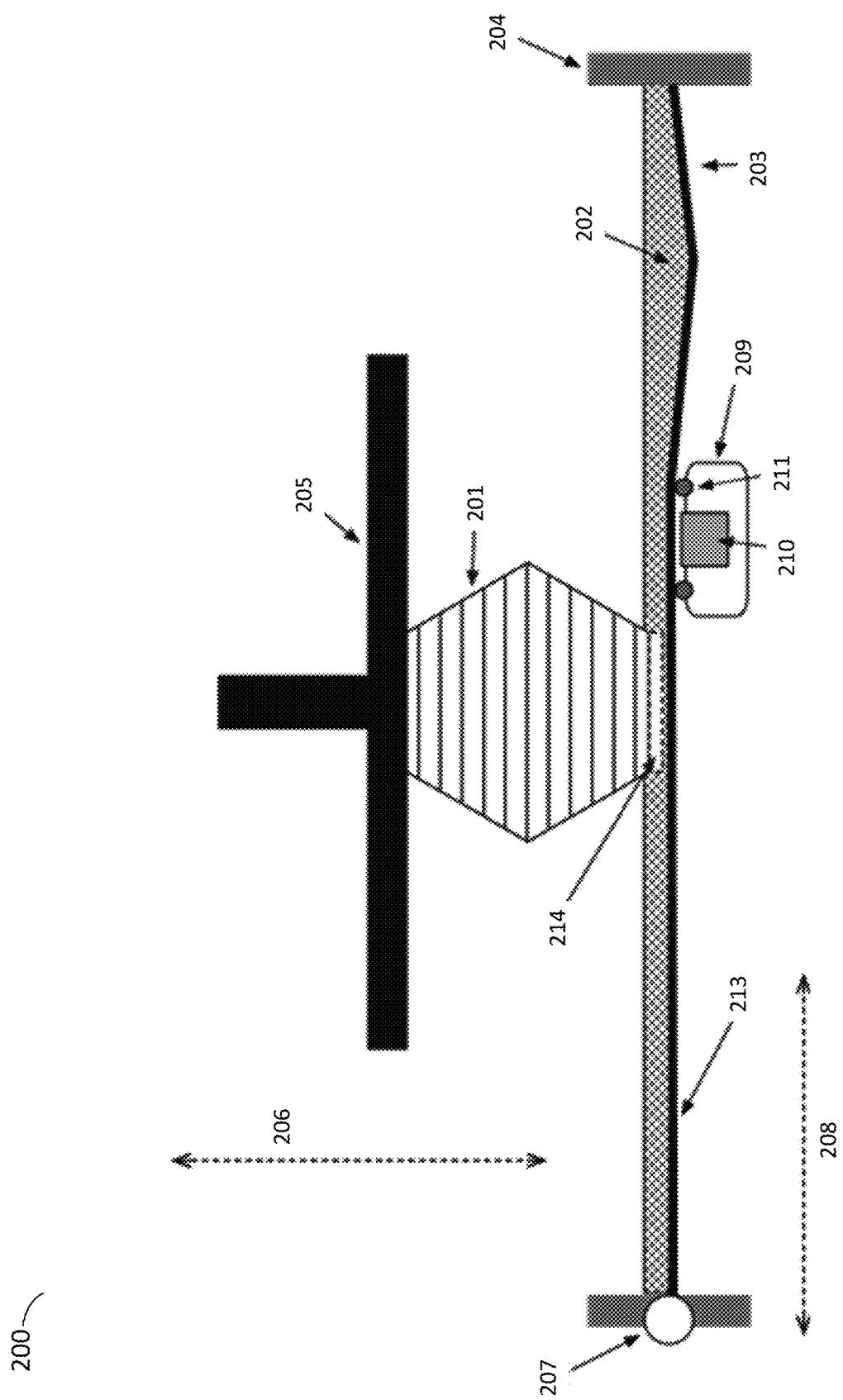

In the example of FIG. 2B, exposure module 209 has been moved along the bottom plane of the tank 204 through axis 208. During this motion, roller elements 211 may press upwards against film 203 in order to flatten any deflection in the film and ensure that the film forms a substantially flat plane between the roller elements in contact with the film. Also during the motion, an exposure source 210 may be activated in order to cause actinic radiation 215 to be selectively emitted at various points along the Y axis. Actinic radiation 215 emitted by the exposure source 210 may be transmitted through the film 203 and irradiate a layer of photopolymer resin 202 located between the film and the lower surface of the part 201. When exposed to the actinic radiation 215, the exposed portion of the photopolymer resin 202 may undergo various reactions, such as polymerization, causing the flowable resin 202 to solidify or otherwise adhere to the previously formed layer of the part 201, forming a new layer 214 of the part 201. As shown in the example of FIG. 2C, the exposure module 209 may continue to move along the X axis while selectively exposing regions along the Y axis using the exposure source 210. Accordingly, any desired region within the X-Y plane of the bottom of the tank 204 may be selectively exposed to actinic radiation, causing polymerization of a new layer 214 of the part 201 in the desired shape.

Following exposure, the newly formed layer 214 may be in contact with both a previously formed layer and the film 203. While adhesion is desirable between the newly formed layer 214 and the prior layers of the part 201, unwanted adhesion may also be formed between the newly formed layer 214 and the film 203. As discussed above, an additional step is typically required to break such adhesive forces before the formation of a new layer, in a process referred to herein as "separation."

Figure 2D:
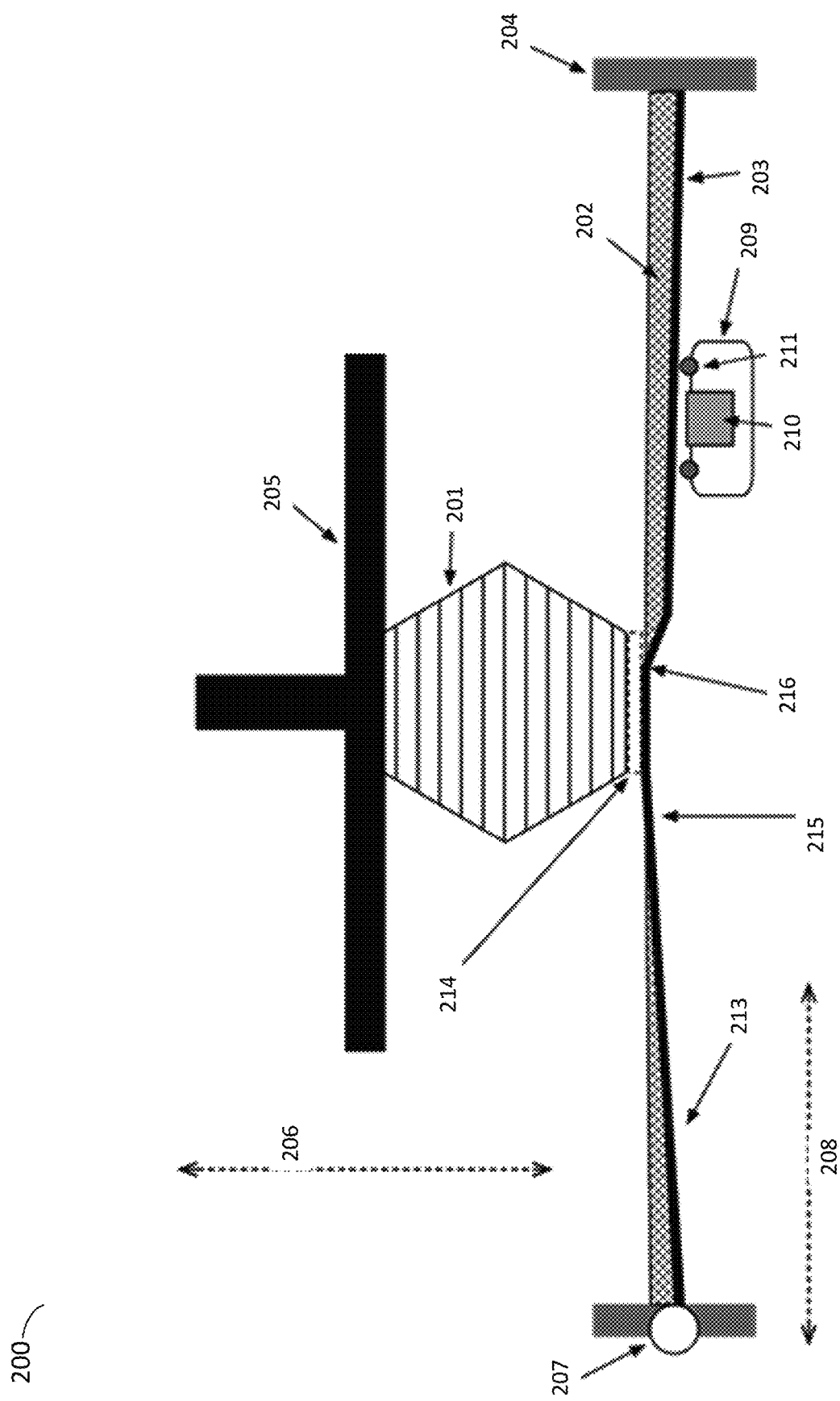

As shown in the example of FIG. 2D, one way of performing separation in illustrative stereolithographic device 200 is to lift the part 201, and thus newly formed layer 214, along axis 206, away from the film 203. Adhesive forces between the newly formed layer 214 and the film 203 may cause the film to deflect upwards 215 as the build platform 205 is moved away. Using a flexible, thin film as at least part of the floor of the container may allow a peeling edge to propagate inward from most or all of the outer edge of the contact area between the part 201 and the film 203. In particular, at a critical level of deflection, at least one portion of the film 203 may begin to separate, or peel, away from the newly formed layer 214, thus forming a peeling edge 216 which propagates across the interfacing surface of the film 203 and newly former layer 214. Separation of this manner may apply considerably less force to the part 201 compared with separation of a part from a rigid container having a release coating, as discussed above.

Following separation pictured in FIG. 2D, a new layer of the part 201 may be formed by returning to the configuration shown in FIG. 2A. In some embodiments, this may comprise returning the exposure module 209 to its original position (as in FIG. 2A) without forming additional solid material. In other embodiments, however, the direction of the exposure module 209 along axis 208 may be reversed, such that the formation process depicted in FIGS. 2A-2D occurs with the exposure module 209 moving in the opposite direction.

Irrespective of the particular stereolithography device and configuration, the above-described issues in which edges of positive features are underexposed and/or negative features are overexposed, may nonetheless persist. Approaches that simply increase the exposure at edges to produce clearer edges of positive features will also cause negative features to be more overexposed. Conversely, approaches that decrease the exposure at edges to produce clearer negative features will also cause the edges of positive features to be less exposed. For instance, with a spot of light that has a Gaussian brightness profile, illuminating one pixel will necessarily create overlap in the surrounding pixels. Because of this, conventional approaches either favor negative features by under-curing edges, or favor positive features by over-curing edges.

In some embodiments, the above issues are mitigated through the use of image processing techniques. The build area over which actinic radiation can be directed to cure material can be thought of as an image, with the relative amount of exposure to be directed to each position in the build area being considered as the brightness of a pixel at that position. For example, if a circular cross-section is to be cured, this may be represented as a grey circle (representing some exposure) over a black background (representing no exposure). In general, various different levels of exposure may be considered within a single image, since anti-aliasing or other techniques may be applied to produce an intended map of the relative extent to which material is to be cured. Such an image is referred to herein as an "exposure map."

According to some embodiments, image processing techniques may be applied to an exposure map that amplify high-frequency components and thereby may adjust the relative exposure around edges compared with non-edge regions. Furthermore, by utilizing the original exposure map as a mask, the relative exposure at edges of positive features may be increased whilst maintaining low exposure of negative features.

One example of such an image processing technique is the unsharp mask process, which operates by subtracting a blurred version of an image from the original image, optionally followed by adjustment of gray level values in the difference image. The inventors have recognized and appreciated that an image processing technique such as the unsharp mask will, when applied to an exposure map, more accurately preserve fine features by amplifying exposure to edges and thin positive features, whilst not substantially affecting negative features.

Figure 3B:
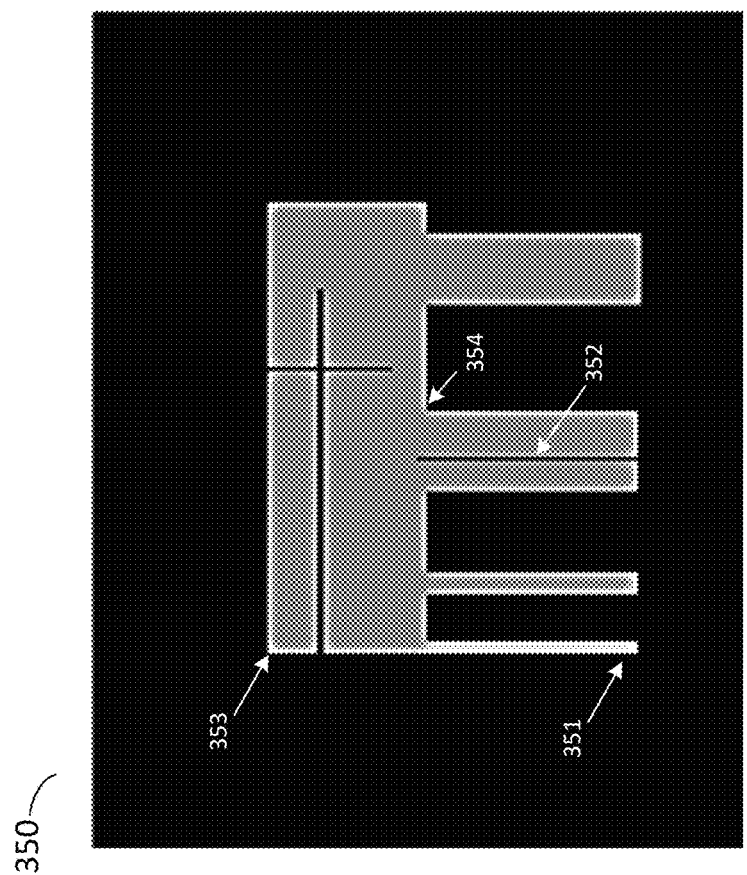
FIG. 3B depicts an illustrative updated exposure map generated by applying an unsharp mask to the exposure map of FIG. 3A, according to some embodiments.
Figure 3A:
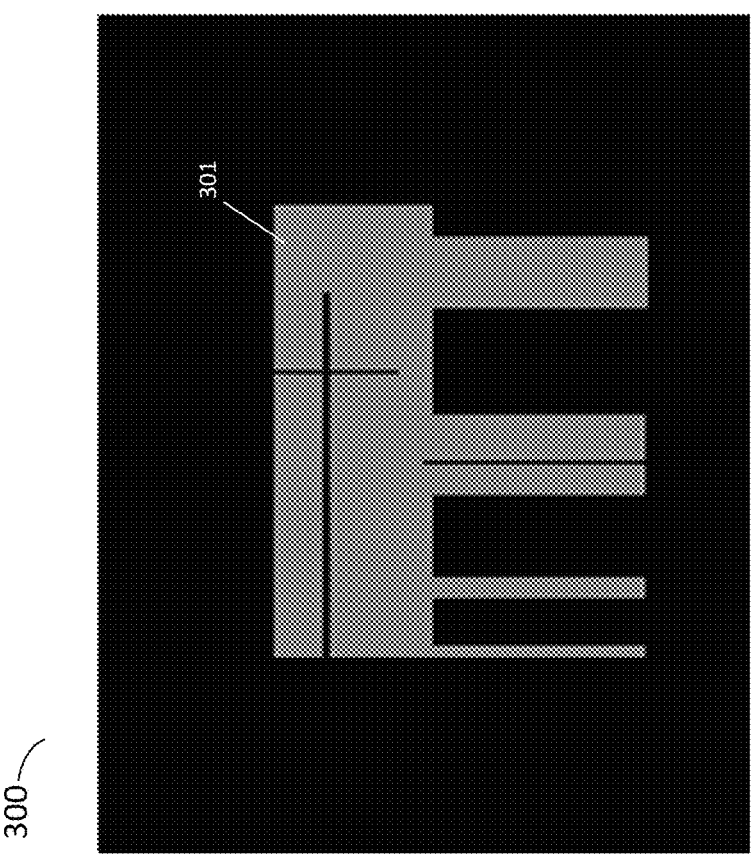
FIG. 3A depicts an illustrative exposure map, according to some embodiments.

As one illustrative example, image 300 shown in FIG. 3A depicts an exposure map for a rectangular build area in which a shape 301, shown in grey, is to be formed by directing actinic energy to the different positions in the build area according to the exposure map. In image 300, the black pixels correspond to regions to which no actinic radiation is to be exposed, and the grey pixels correspond to regions in which a particular level of exposure is to be produced, indicated by the shade of grey. Applying an unsharp mask to the image 300 may generate image 350, in which various areas of the shape 301 are shaded with a lighter grey (or even white), corresponding to a higher level of exposure, whilst the black regions in image 300 remain black in image 350. Features such as fine positive feature 351 has a comparatively large increase in brightness in image 350 compared with image 300, whilst a fine negative feature 352 has a comparatively small increase in brightness of the positive regions around the negative feature in image 350 compared with image 300. Exposure may also be differentiated between positive corners (e.g. 353) and negative corners (e.g. 354). Positive corners may receive amplification shown in FIG. 4B through increased brightness while negative corners may not be amplified, which may function to ensure the negative feature is produced. As such, when exposing regions of a liquid photopolymer according to exposure map 350 compared with exposure map 300, the positive edges and fine positive features may be expected to be substantially more exposed whereas positive regions around fine negative features may be expected to be somewhat more exposed. Thus, this process more accurately preserves fine features by amplifying exposure to edges and thin positive features, whilst not substantially affecting negative features.

Figure 4A:
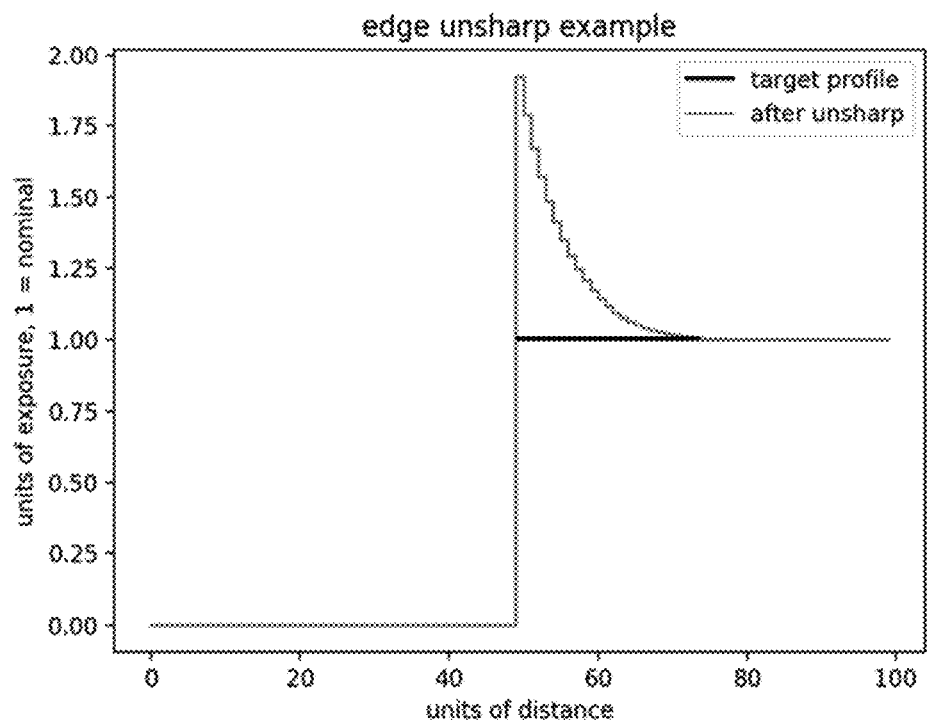
FIGS. 4A-4C are graphs illustrating details of applying an unsharp mask to regions of an exposure map, according to some embodiments.
Figure 4B:
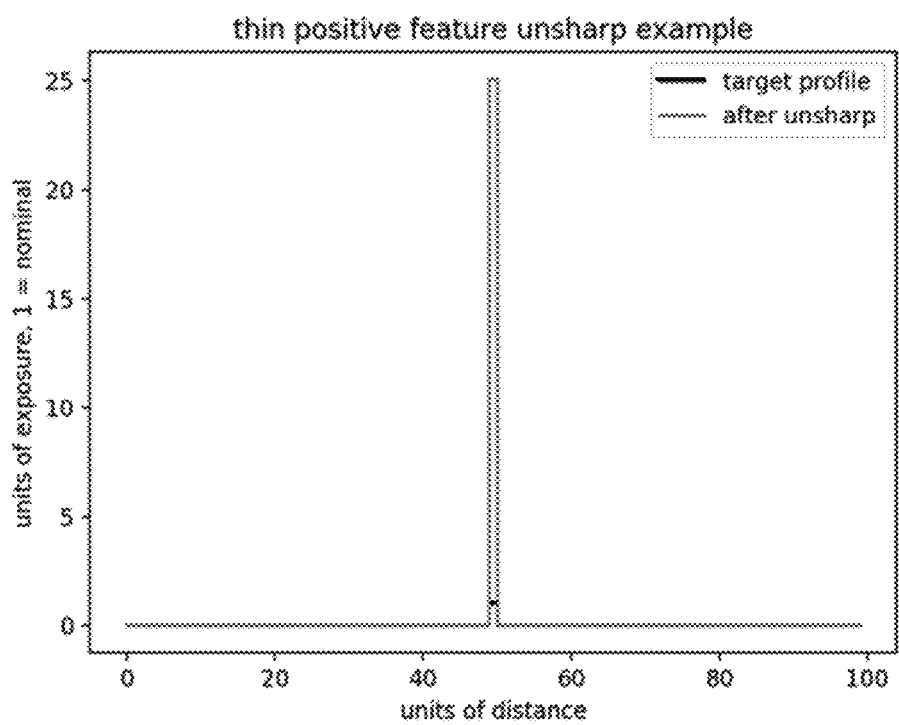
Figure 4C:
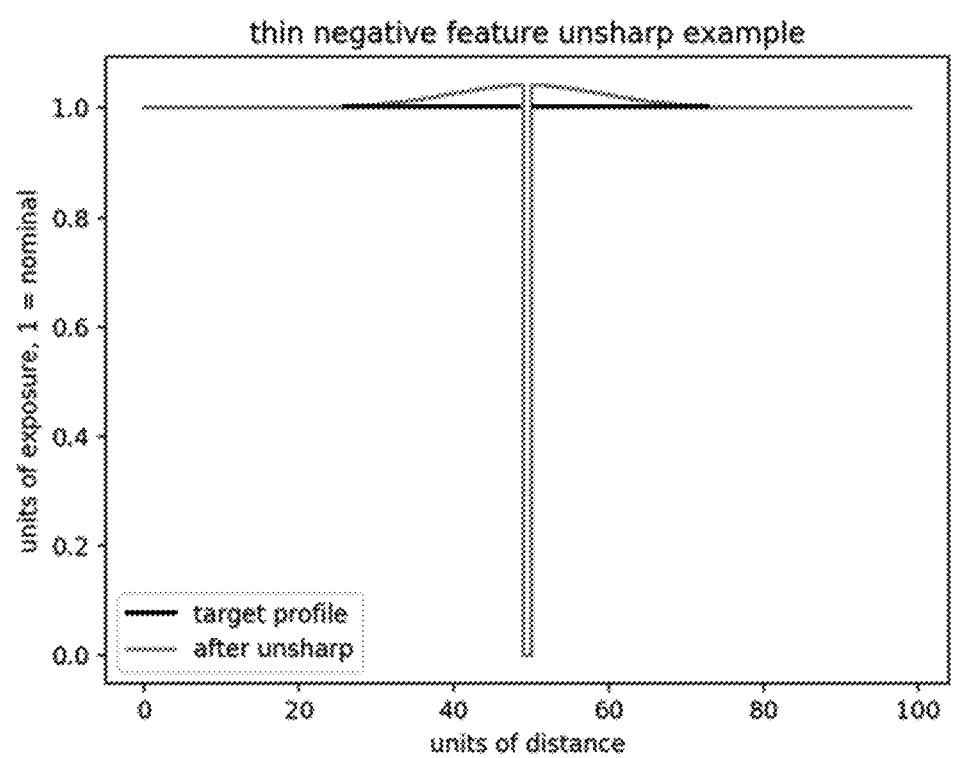

FIGS. 4A-4C depict additional details on applying an unsharp mask to regions of an exposure map, according to some embodiments. In each of FIGS. 4A, 4B and 4C, nominal units of distance along an axis within an exposure map are measured along the horizontal axis and nominal units of exposure are measured along the vertical axis. In the example of FIG. 4A, an edge of an exposure map is represented by a step from zero exposure to the nominal exposure unit of 1.0 (solid black line). Subsequently, an unsharp mask may be applied to the exposure map to generate an updated exposure map (solid grey line) in which the edge is much more exposed (exposure values above 1.0) whereas the non-exposed portion exterior to the positive edge may be unchanged. Similarly, the interior region of the positive feature at the right hand side of FIG. 4A may be unchanged.

In the example of FIG. 4B, a thin positive feature within an exposure map is represented, again with a nominal exposure level of 1.0 (solid black line). Subsequently, an unsharp mask may be applied to the exposure map to generate an updated exposure map (solid grey line) in which the fine positive feature is much more exposed (exposure values significantly above 1.0) whereas the non-exposed portion exterior to the positive feature may be unchanged.

In the example of FIG. 4C, a thin negative feature within an exposure map is represented with a nominal exposure level of 0, whereas positive regions on either side of the negative feature are represented with a nominal exposure level of 1.0 (solid black line). Subsequently, an unsharp mask may be applied to the exposure map to generate an updated exposure map (solid grey line) in which the fine negative feature remains at the nominal exposure level of 0, while the positive regions on either side of the negative feature are slightly more exposed (exposure values between 1.0 and 1.1). The interior region of the positive regions on the left and right sides of FIG. 4C may be unchanged.

It will be appreciated that an unsharp mask in image processing may decrease the brightness of some parts of an image in addition to increasing the brightness of some parts of an image. In the above example, only increases in brightness as a result of applying an unsharp mask to an exposure map are considered for a system that is only configured to apply energy to cure a photopolymer. In some embodiments, however, a stereolithography system may be configured to apply negative exposure to parts of a build area through selectively inhibiting curing or otherwise. Selectively inhibiting curing to thereby provide a negative exposure may comprise supplying additives in the liquid photopolymer, using materials with higher cure energies, and/or applying multiple cure wavelengths to activate a curing blocker that raises the curing energy required. In the case of a curing blocker, one or more additives may be supplied throughout the liquid photopolymer such that positive exposure may be produced by directing one wavelength of actinic radiation to some regions and negative exposure may be produced by directing a plurality of wavelengths of actinic radiation to other regions.

Figure 5:
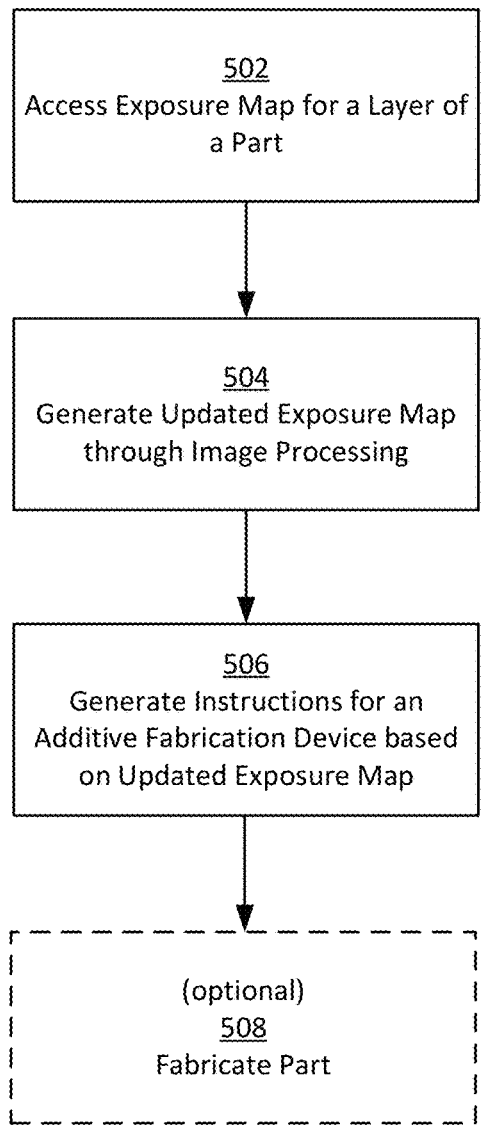
FIG. 5 is a flowchart of a method of generating instructions for an additive fabrication device to fabricate a part according to an exposure map that preserves fine features by amplifying exposure to edges and thin positive features, whilst not substantially affecting negative features, according to some embodiments.

FIG. 5 is a flowchart of a method of generating instructions for an additive fabrication device to fabricate a part according to an exposure map that preserves fine features by amplifying exposure to edges and thin positive features, whilst not substantially affecting negative features, according to some embodiments. Method 500 may be performed by any suitable computing device, examples of which are discussed below.

Method 500 begins in act 502 in which an exposure map for a layer of a part being fabricated is accessed. Act 502 may, in some cases, be performed as part of, or subsequent to, a slicing operation of a three-dimensional model of a part in which a plurality of two-dimensional layers are determined for fabrication to together form the part. An exposure map may be represented using any suitable type of image, including by a grayscale image. In some embodiments, act 502 may comprise generating an exposure map for a layer of a part based on a three-dimensional model. The exposure map may convey relative exposure levels for different locations within a build area in any suitable way, and is not limited to the images of FIGS. 3A-3B in which the exposure is indicated by the brightness of a pixel, with a brighter (more white) value indicating a higher exposure and a less bright (more black) value indicating a lower exposure.

In act 504, an updated exposure map is generated based on the exposure map accessed in act 502 via one or more image processing techniques. As discussed above, one such image processing technique is an unsharp mask. Other suitable image processing techniques may include any suitable deconvolution process(es). Irrespective of the image processing technique or techniques applied in act 504, the updated exposure map may, in comparison with the exposure map accessed in act 502, amplify exposure levels of edges and thin positive features, whilst not substantially affecting negative features. As discussed above, an exposure map may convey relative exposure levels for different locations within a build area in any suitable way; the updated exposure map may convey relative exposure levels in the same, or in a different way than the exposure map accessed in act 502.

The shape of a beam of light, such as a laser, may depend on several factors including lenses between the light source and build region, a distance from the light source to the build region, a composition of the liquid photopolymer container (e.g., types of films, an elastic coating applied to a rigid container, etc.), and the type of liquid photopolymer used. The shape of such a beam may be described as the Point Spread Function (PSF) of the source of actinic radiation. According to some embodiments, a blurring operation that is part of an unsharp mask and/or other image processing technique(s) applied in act 504 may be based on the PSF of the light source, container and liquid photopolymer system. In some cases, the PSF of the system can be determined empirically using, for instance, the relationship $\sigma_{new} = \sqrt{\sigma_1^2 + \sigma_1^2}$ where $\sigma_1$ indicates the size of the light spot and $\sigma_2$ is a factor of the liquid photopolymer.

According to some embodiments, a deconvolution operation may be applied to the desired layer mask, deconvolving by the PSF to give an exposure to send to the imaging system that will come closest to realizing the desired layer. Likewise, an unsharp mask can be used to approximate this deconvolution operation.

According to some embodiments, generating an updated exposure map in act 504 may be based on part, but not all of the image data of the exposure map accessed in act 502. In some cases, processing every pixel in an exposure map may be considered too computationally expensive or difficult and as such the structure of the exposure map may be simplified prior to one or more image processing steps such as an unsharp mask. Generally, exposure maps may be expected to be sparse, with large regions being fully exposed or not exposed, and the perimeters being of most interest for the image processing of act 504. In some embodiments, the exposure map accessed in act 502 may be represented as a set of scanline "spans," which are simplifications that group multiple pixels together as either being exposed or not exposed. According to some embodiments, one or more spans may be generated through a compression operation that groups contiguous pixels with the same energy density (or within a common range of energy densities) into a span.

In act 506, the computing device performing method 500 generates instructions for an additive fabrication device based on the updated exposure map generated in act 504. The generated instructions may include instructions to activate and deactivate a source of actinic radiation, to adjust the intensity of said source, to direct said source to various locations within a build region, etc. The instructions may cause exposure of the build region according to the updated exposure map by varying the speed at which the light is directed over a region, by, for example, varying the intensity of the light (e.g., adjusting laser power), by selecting a number of passes over the same region, or combinations thereof. According to some embodiments, adjusting the light intensity and/or the number of passes may be more advantageous than adjusting the speed at which light is directed because varying the scan speed may result in time dependent cure artifacts. Such artifacts are described for instance in U.S. Patent Application Publication No. US2018-0085994, titled "Techniques for Reducing Differential Cure Artifacts for Additive Fabrication and Related Systems and Methods," which is hereby incorporated by reference in its entirety. Moreover, modulating only the intensity of light over a single pass would slow down the print by using a lower than optimal power for most of the print in order to achieve the energy required for the finest features. As such, an approach that both modulates light intensity and the number of passes while keeping the speed of the light scanning constant may be preferred.

Method 500 may end with act 506, or may optionally include act 508 in which the part is fabricated by executing the instructions generated in act 506 by a suitable additive fabrication device.

In contrast to the above image processing techniques, another technique that may be applied to preserve negative fine features will be described below. This technique may be applied separately from, or in addition to, the image processing techniques described above.

Figure 6A:
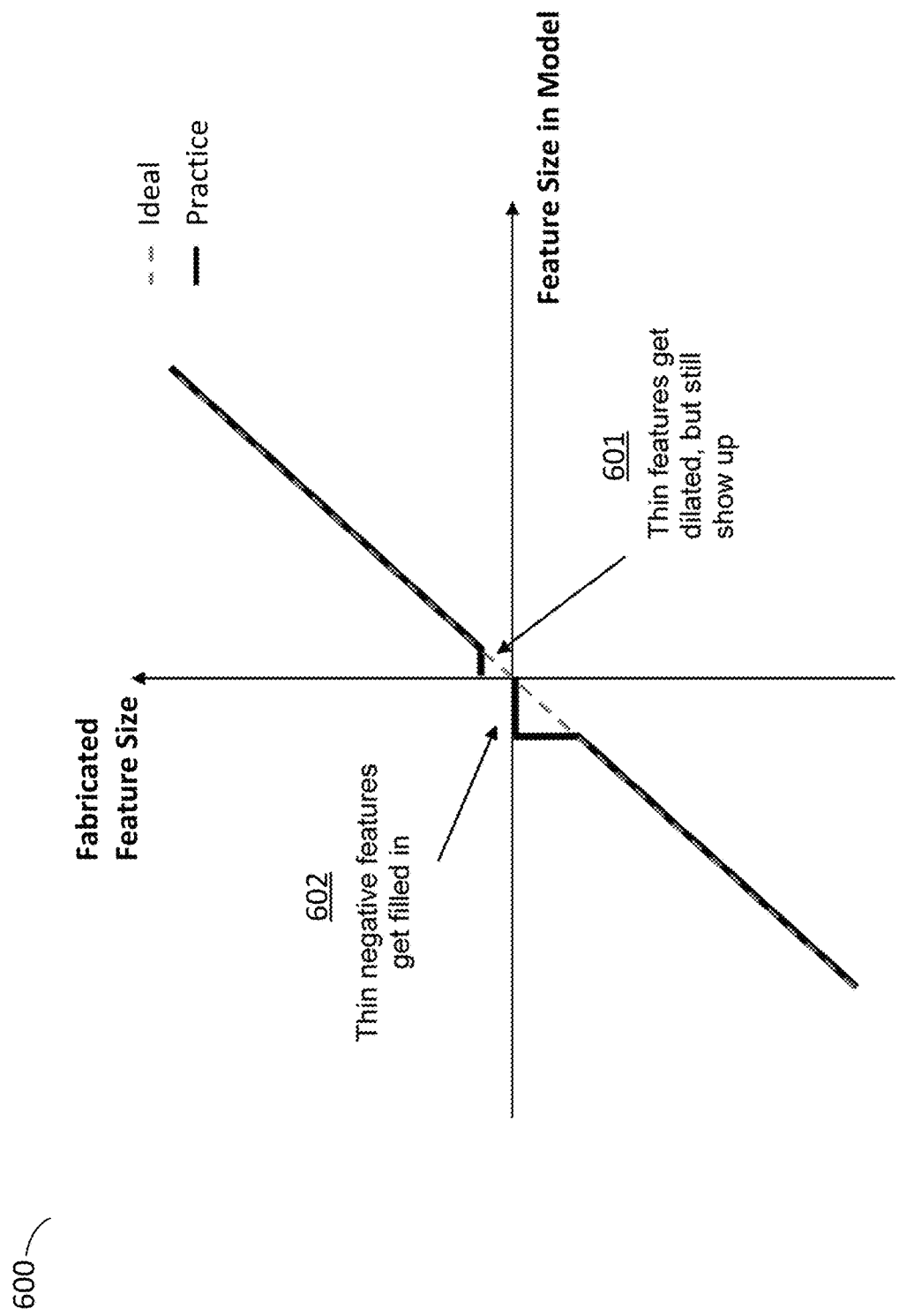
FIGS. 6A-6B depicts illustrative approaches to forming fine features, according to some embodiments.

FIG. 6A depicts one illustrative approach to forming fine features, according to some embodiments. Graph 600 depicts how features on a part are formed based on their size, with the horizontal axis representing the size of a feature within a three-dimensional model of the part, and the vertical axis representing the size of the same feature when it is fabricated. The positive side of the axes represents the size of positive features with the negative side of the axes representing negative features. The closer to the origin, the smaller the feature. An ideal additive fabrication device would produce a part with feature sizes that lie along the 45° dashed line—that is, the size of a feature when fabricated would always be the same as the size of the feature in the model. In practice, however, fabrication processes generally have a lower size limit at which features cannot be fabricated precisely as intended.

Graph 600 represents one approach to addressing the limitations of the additive fabrication process, wherein fine positive features 601 below a certain size in the model are fabricated with a minimum size in the part which may be larger than the intended size of the digital model, and fine negative features 602 below a certain size in the model are simply filled in. This approach may be disfavored, however, because detail may be lost.

Figure 6B:
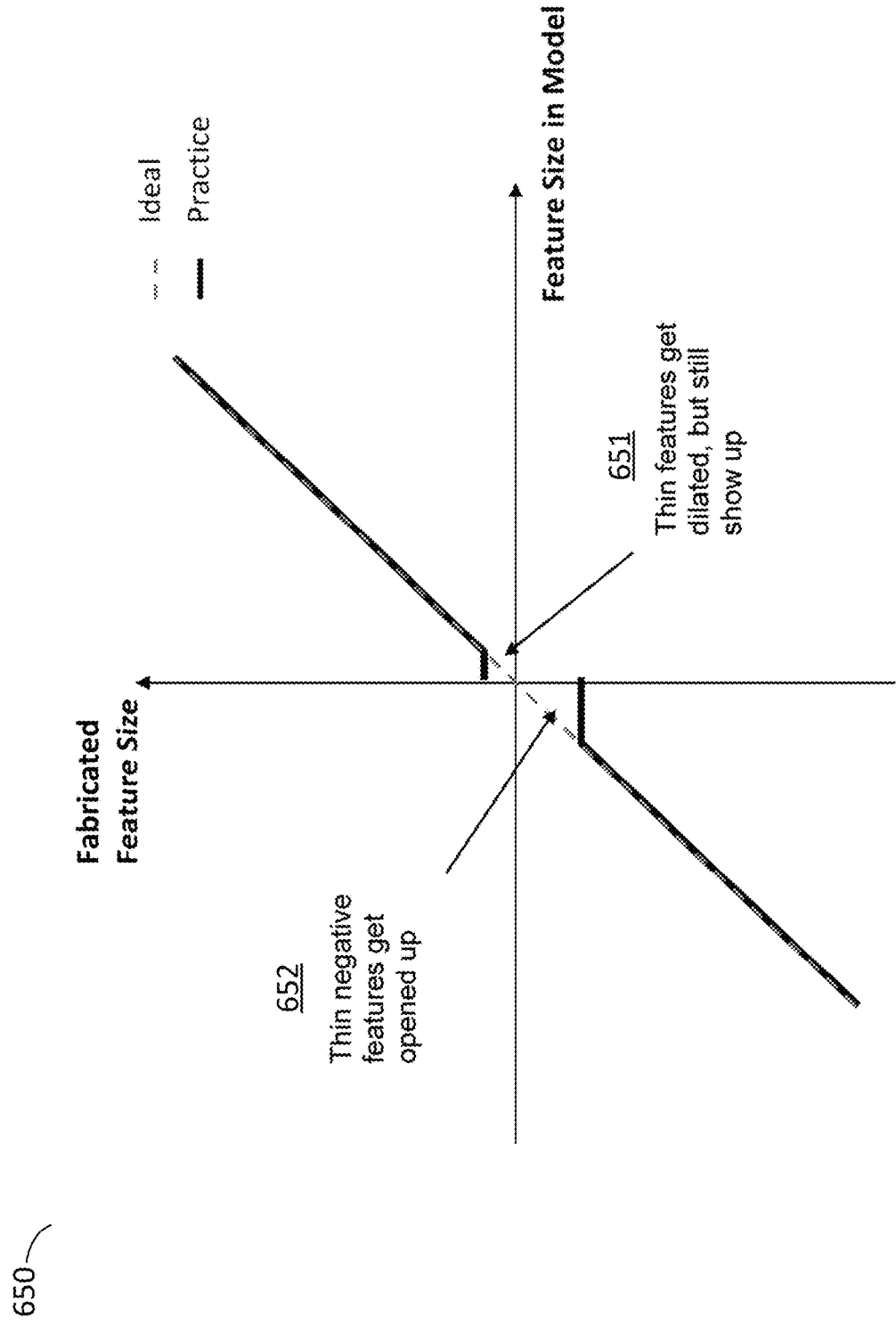

Graph 650 shown in FIG. 6B represents an alternative approach to that of FIG. 6A. In graph 650, fine positive features 651 below a certain size in the model are again fabricated with a minimum size in the part, but fine negative features 652 below a certain size in the model are left open with a minimum size.

One practical approach to producing the behavior of FIG. 6B is shown in FIGS. 7A-7D. In the example of FIGS. 7A-7D, a triangular-shaped negative feature is to be formed within a positive region (shaded blue). The upper tip of the triangle may, however, be too small to be fabricated by the additive fabrication device. This shape may be modified to preserve the fine negative feature of the triangle tip in the following manner, which may be performed by any suitable computing device.

First, in FIG. 7A, the medial axis of the layer is determined. A medial axis transform, sometimes also called skeletonization, reduces a shape to a skeletal remnant that largely preserves the extent and connectivity of the original shape while losing most of the original shape itself. In FIG. 7A, the medial axis is shown as a solid line within the triangle. In addition, the inverse of binary closing of the triangular region is calculated (shown as a solid region within the triangle), which identifies by exclusion the regions of the negative feature that are too small to be fabricated using the stereolithographic device. It will be appreciated that any other suitable technique may be applied in FIG. 7A to identify regions of the negative feature that are too small to be fabricated using the stereolithographic device and that the techniques described herein are not limited to the particular illustrated approach.

According to some embodiments, a medial axis may be calculated in the following manner. For a shape $\mathcal{O}$ a medial axis transform MAT($\mathcal{O}$) is the set of all maximal, empty and open balls. A ball B(c, r)$\subseteq \mathcal{O}$ centered at c$\in \mathcal{O}$ with radius r is called maximal if it is not contained in any other open ball contained in $\mathcal{O}$. A ball in the medial axis transform may be called a medial ball and the union of the centers of all medial balls may be called the medial axis of the shape $\mathcal{O}$.

According to some embodiments, an inverse of binary closing may be calculated by performing a dilation and erosion of the positive region to be fabricated, wherein the erosion is performed using the small feature that can be produced via the stereolithographic device. The binary closing thereby fills in any areas that are smaller than the smallest feature. The inverse of the binary closing, however, allows for prioritization of a negative feature over positive regions. The interior shaded portion of FIG. 7A thereby identifies by exclusion only the portions of the medial axis that cannot be fabricated using the stereolithographic device.

In FIG. 7B, portions of the medial axis are selected that are not within the inverse of binary closing in FIG. 7A. Formation of solid material may be allocated around portions with a minimum size 705 as shown in FIG. 7C. Optionally in FIG. 7C, any of the medial axis portions below some minimum size 710 may be removed, effectively acting as an angle filter. Finally, fabrication of the negative triangle feature may be considered by combining the allocated portions in FIG. 7C (irrespective of whether or not small segments are removed) with the inverse of the binary closing region to produce the shape shown in FIG. 7D. Thus, the negative triangle feature may be fabricated without losing the top portion of the triangle as would be expected if negative fine features are simply filled in below a certain size (as in the example of FIG. 6A).

It will be appreciated that the process of FIGS. 7A-7D may equally be applied to positive fine features by analyzing the shape of the positive feature in the same way as the negative feature was analyzed above.

Figure 8:
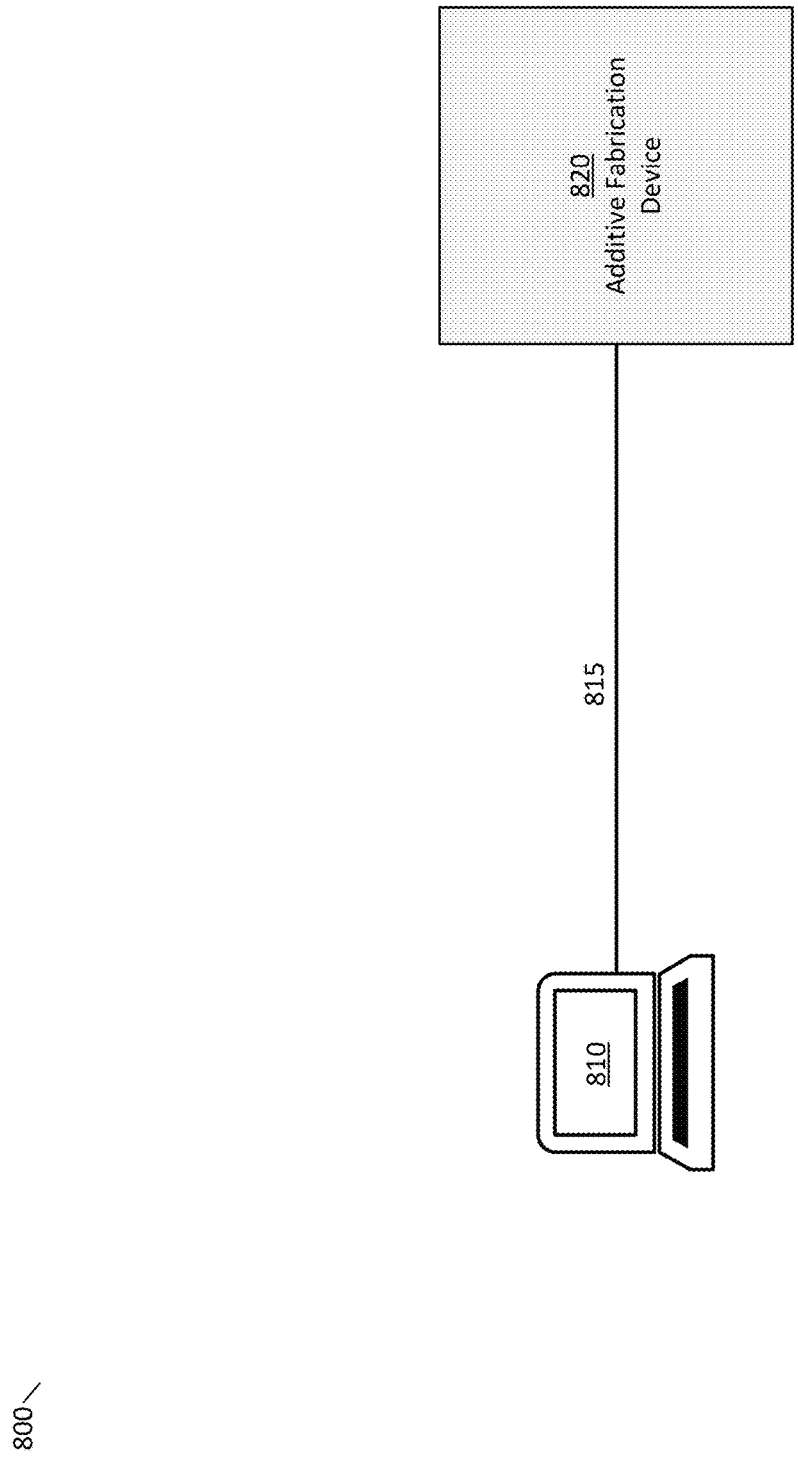
FIG. 8 illustrates an example of a computing system environment on which aspects of the invention may be implemented.

FIG. 8 is a block diagram of a system suitable for practicing aspects of the invention, according to some embodiments. System 800 illustrates a system suitable for generating instructions to perform additive fabrication by an additive fabrication device and subsequent operation of the additive fabrication device to fabricate an object. For instance, instructions to fabricated solid material according to an exposure map as described by the various techniques above may be generated by the system and provided to the additive fabrication device. Various parameters associated with fabricating solid material according to an exposure map may be stored by system computer system 810 and accessed when generating instructions for the additive fabrication device 820.

It will be appreciated that any of the above-described techniques to preserve positive and/or negative features may be combined in any suitable manner and in any suitable order. In some cases, techniques may be combined in a preferential ordering to favor certain features. For example, for a comb shape with many alternating negative features that get progressively smaller, the medial axis approach of FIGS. 7A-7D may at some point produce a comb that is empty as each negative would be expanded to the smallest negative possible and the positive would be eliminated. A second medial axis analysis may be performed, however, on the positive features to preserve those and/or an unsharp mask could be subsequently performed, which favors positives.

According to some embodiments, computer system 810 may execute software that generates instructions for fabricating a part using additive fabrication device, such as method 500 shown in FIG. 5. Said instructions may then be provided to an additive fabrication device, such as additive fabrication device 820, via link 815, which may comprise any suitable wired and/or wireless communications connection. In some embodiments, a single housing holds the computing device 810 and additive fabrication device 820 such that the link 815 is an internal link connecting two modules within the housing of system 800.

Figure 9:
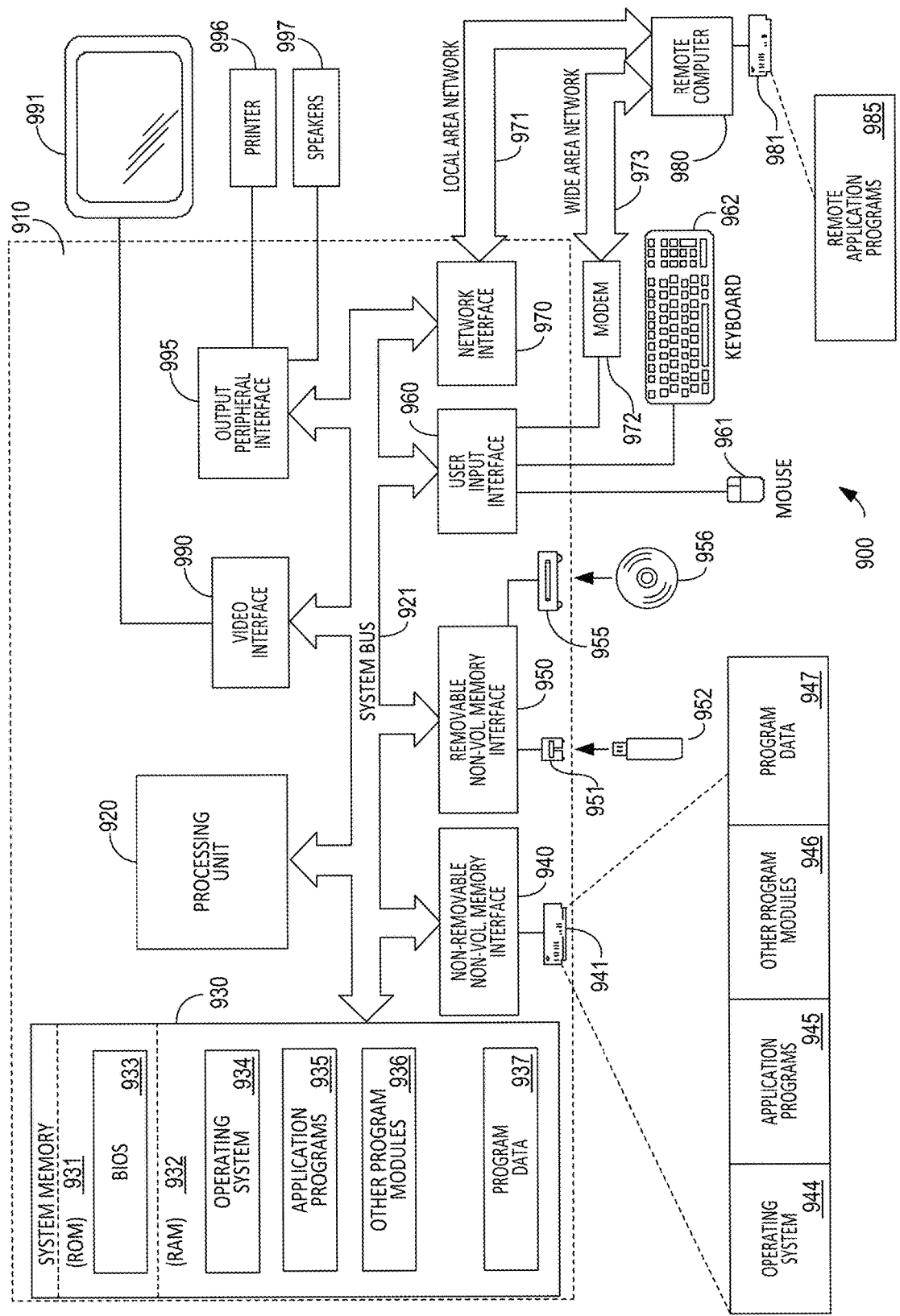
FIG. 9 illustrates an example of a computing system environment on which aspects of the invention may be implemented.

FIG. 9 illustrates an example of a suitable computing system environment 900 on which the technology described herein may be implemented. For example, computing environment 900 may form some or all of the computer system 810 shown in FIG. 8. The computing system environment 900 is only one example of a suitable computing environment and is not intended to suggest any limitation as to the scope of use or functionality of the technology described herein. Neither should the computing environment 900 be interpreted as having any dependency or requirement relating to any one or combination of components illustrated in the exemplary operating environment 900.

The technology described herein is operational with numerous other general purpose or special purpose computing system environments or configurations. Examples of well-known computing systems, environments, and/or configurations that may be suitable for use with the technology described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The technology described herein may also be practiced in distributed computing environments where tasks are performed by remote processing devices that are linked through a communications network. In a distributed computing environment, program modules may be located in both local and remote computer storage media including memory storage devices.

With reference to FIG. 9, an exemplary system for implementing the technology described herein includes a general purpose computing device in the form of a computer 910. Components of computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 910. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 936, and program data 937.

The computer 910 may also include other removable/non-removable, volatile/nonvolatile computer storage media. By way of example only, FIG. 9 illustrates a hard disk drive 941 that reads from or writes to non-removable, nonvolatile magnetic media, a flash drive 951 that reads from or writes to a removable, nonvolatile memory 952 such as flash memory, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

The drives and their associated computer storage media discussed above and illustrated in FIG. 9, provide storage of computer readable instructions, data structures, program modules and other data for the computer 910. In FIG. 9, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies. A user may enter commands and information into the computer 910 through input devices such as a keyboard 962 and pointing device 961, commonly referred to as a mouse, trackball or touch pad. Other input devices (not shown) may include a microphone, joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A monitor 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 9. The logical connections depicted in FIG. 9 include a local area network (LAN) 971 and a wide area network (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960, or other appropriate mechanism. In a networked environment, program modules depicted relative to the computer 910, or portions thereof, may be stored in the remote memory storage device. By way of example, and not limitation, FIG. 9 illustrates remote application programs 985 as residing on memory device 981. It will be appreciated that the network connections shown are exemplary and other means of establishing a communications link between the computers may be used.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. However, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a non-transitory computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software," when used herein, are used in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. A computer-implemented method of generating instructions for an additive fabrication device that, when executed by the additive fabrication device, fabricate a part, the method comprising:
accessing a first exposure map for a layer of the part, the first exposure map indicating first exposure levels for a plurality of locations in a two-dimensional region;
generating, using at least one processor, a second exposure map based on the first exposure map, said generating comprising performing at least one image deconvolution operation on the first exposure map, wherein the second exposure map indicates second exposure levels for the plurality of locations in the two-dimensional region;
generating, using the at least one processor, instructions for an additive fabrication device that, when executed by the additive fabrication device, fabricate at least the layer of the part according to the generated second exposure map; and
providing the generated instructions to the additive fabrication device.

2. The method of claim 1, wherein fabricating the layer of the part according to the generated second exposure map comprises adjusting light intensity of a light source according to the generated second exposure map.

3. The method of claim 1, wherein fabricating the layer of the part according to the generated second exposure map comprises selecting a number of passes of a light source according to the generated second exposure map.

4. The method of claim 3, wherein fabricating the layer of the part according to the generated second exposure map also comprises adjusting light intensity of the light source according to the generated second exposure map.

5. The method of claim 1, further comprising generating, using the at least one processor, the first exposure map for the layer of the part based on a 3-dimensional model representing the part.

6. The method of claim 1, wherein the first exposure map indicates a nominal exposure level for each of the plurality of locations in the two-dimensional region, and wherein the second exposure map indicates exposure levels above the nominal exposure level for a portion of the plurality of locations in the two-dimensional region.

7. The method of claim 6, wherein the portion of the plurality of locations in the two-dimensional region having exposure levels above the nominal exposure level in the second exposure map includes the edges of the first exposure map.

8. The method of claim 1, wherein the additive fabrication device is configured to fabricate the part by directing a source of actinic radiation onto a liquid photopolymer, and wherein the generated instructions comprise instructions to operate the source of actinic radiation.

9. The method of claim 8, wherein generating the second exposure map is further based on a point spread function (PSF) of the source of actinic radiation.

10. At least one computer readable medium comprising instructions that, when executed by at least one processor, perform a method of configuring an additive fabrication device to fabricate a part, the method comprising:
accessing a first exposure map for a layer of the part, the first exposure map indicating first exposure levels for a plurality of locations in a two-dimensional region;
generating, using the at least one processor, a second exposure map based on the first exposure map, said generating comprising performing an unsharp mask operation on the first exposure map, wherein the second exposure map indicates second exposure levels for the plurality of locations in the two-dimensional region;
generating, using the at least one processor, instructions for the additive fabrication device that, when executed by the additive fabrication device, fabricate at least the layer of the part according to the generated second exposure map; and
providing the generated instructions to the additive fabrication device.

11. The at least one computer readable medium of claim 10, wherein fabricating the layer of the part according to the generated second exposure map comprises adjusting light intensity of a light source according to the generated second exposure map.

12. The at least one computer readable medium of claim 10, wherein fabricating the layer of the part according to the generated second exposure map comprises selecting a number of passes of a light source according to the generated second exposure map.

13. The at least one computer readable medium of claim 10, wherein the first exposure map indicates a nominal exposure level for each of the plurality of locations in the two-dimensional region, and wherein the second exposure map indicates exposure levels above the nominal exposure level for a portion of the plurality of locations in the two-dimensional region.

14. The at least one computer readable medium of claim 13, wherein the portion of the plurality of locations in the two-dimensional region having exposure levels above the nominal exposure level in the second exposure map includes the edges of the first exposure map.

15. The at least one computer readable medium of claim 10, wherein the additive fabrication device is configured to fabricate the part by directing a source of actinic radiation onto a liquid photopolymer, and wherein the generated instructions comprise instructions to operate the source of actinic radiation.

16. The at least one computer readable medium of claim 15, wherein generating the second exposure map is further based on a point spread function (PSF) of the source of actinic radiation.

* * * * *